UNITED STATES PATENT OFFICE.

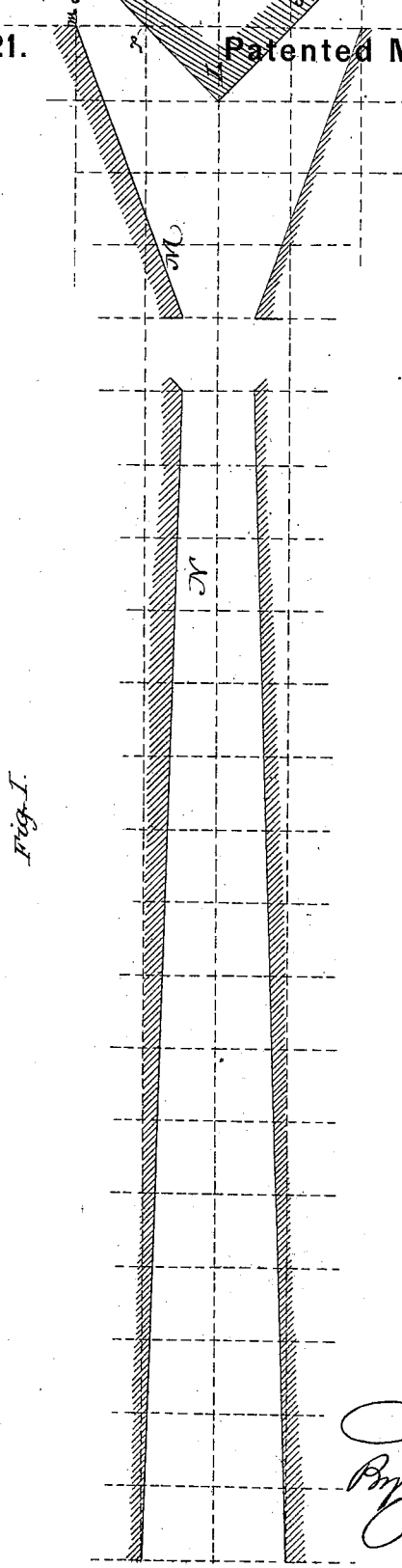

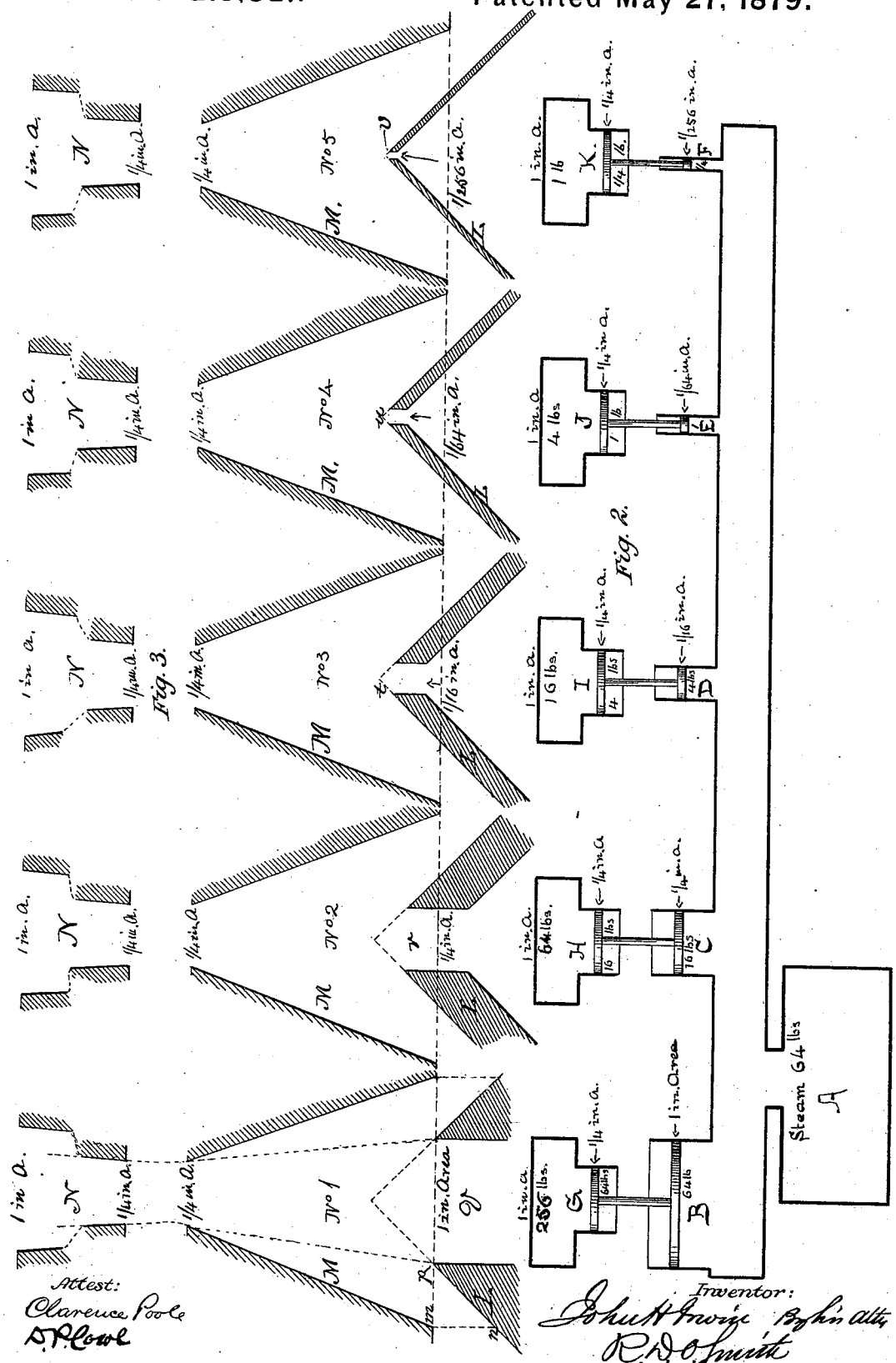

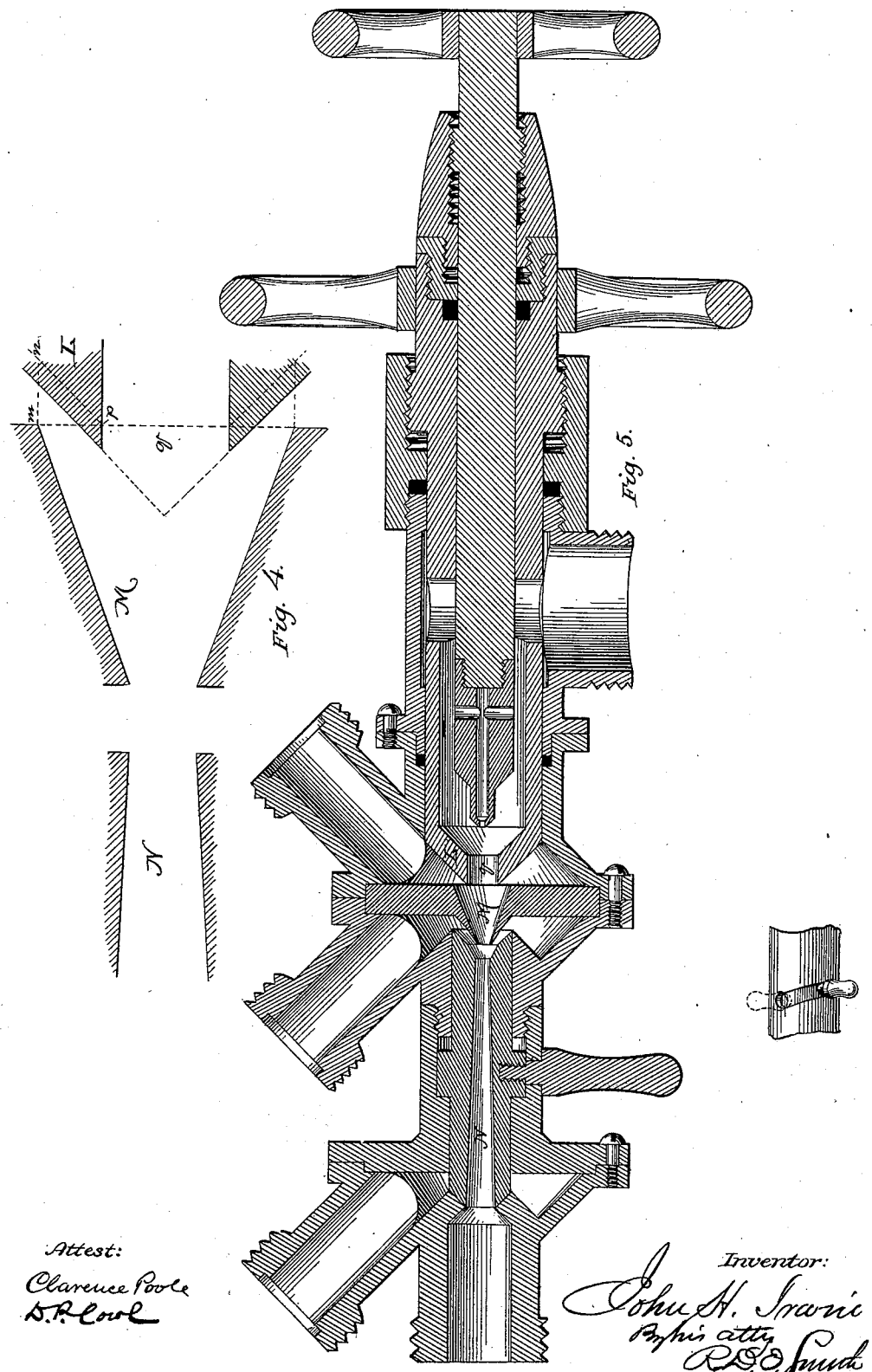
J. H. IRWIN.
Injector and Ejector.
No. 215,821. Patented May 27, 1879.
3 Sheets—Sheet 3.

JOHN H. IRWIN, OF PHILADELPHIA, PENNSYLVANIA.

IMPROVEMENT IN INJECTORS AND EJECTORS.

Specification forming part of Letters Patent No. 215,821, dated May 27, 1879; application filed November 21, 1878.

*To all whom it may concern:*

Be it known that I, JOHN H. IRWIN, of Philadelphia, in the county of Philadelphia and State of Pennsylvania, have invented certain Improvements in that class of instruments known as "Injectors and Ejectors;" and that the following specification contains a full and complete description of the same.

The object of my invention is to obtain the full dynamic value of the steam-discharge, so as to exert a force to move masses of water, air, or other fluids equivalent to the heat expended. It is manifest that improvements in the injector, having this object in view, must be in the determination of the form and proportions of the parts of the instrument itself which will reduce friction to its lowest terms, and exactly proportion work to be done to force expended, so that there shall be no excess of resistance on the one hand, nor waste of force on the other. With this object in view, I have conducted a long and exhaustive series of experiments, and have determined the proper relation to parts which will accomplish the object sought and develop practically the full dynamic value of the steam discharged. This result has not, to the best of my knowledge, hitherto been attained, even approximately, with an instrument of this class.

In this patent I propose to describe and cover only that part of an injector which embodies the effective principle of the invention, leaving the modifications of other parts to especially adapt the instrument to particular purposes to be described in other patents. The parts, therefore, to which this patent has reference are known as the "steam-cone," the "combining-cone," and the "receiving-cone."

That others may fully understand my invention, I will particularly describe it, and illustrate graphically the effects which instrumental experiment has demonstrated.

Reference is had to the accompanying drawings, wherein Figure 1 is a sectional view, representing the relation between the steam-cone, the combining-cone, and receiving-cone. Fig. 2 is a diagram, illustrating, in a series, the relations of pressures upon areas. Fig. 3 represents a series of steam-cones, combining-cones, and receiving-cones, having corresponding cross-sectional areas and productive of corresponding pressures. Fig. 4 is a sectional view, showing the adjustable relation between the steam-cone and the combining-cone. Fig. 5 is a longitudinal section of an injector constructed in accordance with my invention.

In the illustration of the operation of this apparatus given below, it is to be understood that simple static pressures are referred to. Friction and movement are not considered.

Suppose A to be a steam-generator, and B C D E F separate cylinders taking steam therefrom, all at a uniform pressure of sixty-four pounds per inch. For convenience in computation, suppose the cylinders B C D E F and their pistons to be, respectively, in area one inch, one-fourth of one inch, one-sixteenth of one inch, one sixty-fourth of one inch, and one two hundred and fifty-sixth part of an inch. Above the cylinders B C D E F, respectively, are other cylinders and pistons, G H I J K, each of one-fourth of one inch area. The pistons, respectively, B G, C H, D I, E J, and F K are connected by rigid rods, and the cylinders G H I J K are each connected with closed receivers, each, for convenience of reference, supposed to have a head of one inch area.

If the steam is admitted to the cylinders B C D E F at a pressure of sixty-four pounds, as stated, the pistons will be equilibrated by equivalent pressure in said receivers according to the well-known static law. The pressure upon the respective receiver-heads will be as follows: Upon the piston in B there is a gross pressure of sixty-four pounds. This gross pressure is transferred to the piston in G, which is only one-fourth the area of B, and will therefore be equilibrated by a pressure of two hundred and fifty-six pounds per inch in the receiver. Upon the piston C there is a gross pressure of sixteen pounds, which is transferred to the piston in H, one-fourth inch in area, and therefore equilibrated by a pressure of sixty-four pounds per square inch in the receiver. Upon piston D there is a gross pressure of four pounds, which, being transferred to piston I, one-fourth inch in area, is equilibrated by a pressure of sixteen pounds per inch in the receiver. Upon piston E there is a gross pressure of one pound, which, in like manner, is transferred to the piston J, one-fourth of an inch in area, and is equilibrated by a pressure of four pounds per inch in the receiver. Upon piston F there is a gross pressure of one-fourth of one pound, which is transferred to piston K, one-fourth of an inch in area, and is equilibrated by a pressure of one pound per inch in the receiver.

The ratio of one to four adopted in this case holds good throughout.

As a result of my experiment, I have discovered that equivalent results by an injector may be obtained with the form and adjustment of the steam-cone, combining-cone, and receiving-cone, which I will now describe.

L is the steam-cone, the outer face of which is inclined to its axis at an angle of forty-five degrees. M is the combining-cone, having the shape of a conical frustum, and has its larger base in diameter, measured internally, four times that of its smaller base, and its larger height equal to the diameter of its base. (See Fig. 1.) For purposes of comparison with the foregoing illustration, the smaller base of said cone is in area one-fourth of one inch. The receiving-cone N is also a conical frustum, having the following dimensions and internal measurements: The smaller base is in diameter equal to the smaller base of the combining-cone; the larger base is twice said diameter, and the length is sixteen times said diameter.

This steam-cone, combining-cone, and receiving-cone are arranged relatively to each other as follows: Their axes are coincident. Upon their axial line they are arranged so that the apex of the cone out of which the steam-cone is constructed will extend within the combining-cone one-fourth the height of said combining-cone, (see Fig. 1,) and the distance intervening between the smaller bases of the combining and receiving cones is equal to the diameter of the smaller base of said combining-cone. The superficial area of the cylindric space between the points $m$ $n$ will then equal the area of the base of the combining-cone.

The axis of the steam-jet is coincident with the axis of the cones, and it issues through an axial jet-opening at the apex of the steam-cone L.

With a certain pressure of steam — say, sixty-four pounds per inch, as in the above illustration—the static effect of the issuing steam-jet will bear a relation to the cross-sectional area of said jet in accordance with the law of static pressures above set forth.

For convenience of comparison, I will refer to areas instead of diameters of the parts. Therefore, suppose the cross-sectional areas to be as follows: Larger base of combining-cone, four inches; smaller base of combining-cone, one-fourth of an inch; smaller base of receiving-cone, one-fourth of an inch; larger base of receiving-cone, one inch; steam-jet opening No. 1, Fig. 3, one inch; steam-jet opening No. 2, Fig. 3, one-fourth of an inch; steam-jet opening No. 3, Fig. 3, one-sixteenth of an inch; steam-jet opening No. 4, Fig. 3, one-sixty-fourth of an inch; steam-jet opening No. 5, Fig. 3, one two hundred and fifty-sixth of an inch. These areas correspond with the areas of the pistons and receivers shown in Fig. 2.

Suppose in No. 1, Fig. 3, steam at sixty-four pounds in boiler issues from the steam-cone through the opening $q$, the cross-sectional area of which equals one square inch, and suppose water at a low temperature to entirely surround the steam-jet as it escapes from the steam-cone, it is then evident that the steam thus issuing would be partly condensed during its passage from said jet-opening to the smaller base of the combining-cone, and would then form a cone of mixed steam and water or steam at low temperature, extending from the steam-jet opening to the smaller base of the combining-cone, as illustrated in No. 1, Fig. 3.

The steam and water or steam at low temperature composing this cone is an actual constant force, being continually renewed by the condensing steam and water in motion; but for the purposes of this illustration it is considered as a constant static force devoid of motion, and it is therefore considered as representing two pistons having areas as four to one, the larger one at the steam-jet subjected to the boiler-pressure of sixty-four pounds.

It is evident that these pistons are connected by the intervening material of the cone, and that the pressure on the piston of larger area at the steam-cone will be transferred through the medium of the connecting material to the piston at the smaller base of the combining-cone, analogous to the transferrence of pressure in the case of pistons B and F, Fig. 2.

At the smaller base of the receiving-cone we also find a piston of steam and water or steam at low temperature having the same relative area as the piston at the smaller base of the combining-cone, and at the larger base of the receiving-cone we find a similar piston corresponding in area to the piston at the smaller base of the steam-cone and in area equal to the head of the receiver, Fig. 2.

Considering the operation in the injector No. 1, Fig. 3, upon the premises just stated, the steam-cone piston transmits its pressure to the combining-cone piston. The combining-cone piston transmits this pressure to the piston in the smaller base of the receiving-cone, and the latter piston transmits its pressure to the piston at the larger base of the receiving-cone, thus quadrupling the pressure upon the imaginary piston at the base of the receiving-cone, analogous to the pressure upon the head of the receiver above G, Fig. 2.

It is apparent that if the first illustration is correct, the second, being a parallel case, must be correct also when pressures only are considered.

In comparing Nos. 2, 3, 4, and 5 of Fig. 2 and Nos. 2, 3, 4, and 5 of Fig. 3, it will be evident that the operation throughout will be under the static law in accordance with the respective areas, as above described and shown.

I employ this graphic method simply to illustrate one of the effects which takes place in the injector as made with the respective forms and proportions described in this specification, and as sufficient for the purpose of this patent, but not as exhausting the subject.

Nos. 1 and 2 are most efficient in moving water, while Nos. 4 and 5 are most efficient in moving air. No. 3 is equally efficient in moving air or water, the temperature and volume of steam and temperature and volume of water, also temperatures and volumes of steam and air, being considered in all these cases.

It will be observed that in each of the above illustrations the cone out of which the steam-cone jet is constructed, the combining-cone, and the receiving-cone bear the same relative sizes and positions, and the jet-openings $q \ r \ t \ u \ v$ vary in location in respect to the larger and smaller bases of the combining-cone simply because they represent cross-sections of said cone at different points.

It will be understood that said openings may be of any diameter between the point $p$ and the apex of the cone L, and that whatever section of the cone said opening may occupy between said points, the resultant pressures will be in accordance with the law above described.

Variations of the forms and proportions herein given will result in decreased efficiency, yet it is manifest that small variations may not affect the general results in a marked or material degree. I therefore do not propose to confine myself with absolute strictness to the rules laid down, but only to such conformity as will result in the production of substantially the same result.

The relative positions of the combining and receiving cones shown in Fig. 3 are those required for the purpose of an injector; but when used for the purpose of an injector this space should be closed by bringing the cones together or by an inclosing-case, so as to cut off access of water or air at that point.

The arrangement of the steam cone or jet in relation to the combining-cone, as described above, is the arrangement for maximum effect under certain pressures of steam.

Varying pressures of steam require a corresponding variation of the distance between the steam-jet and the smaller base of the combining-cone, and also a variation of the water or air space located at the larger base of the combining-cone, and this is effected by advancing the steam cone or jet into the combining-cone.

The exterior angle of the steam-cone (forty-five degrees to its axis) is the precise angle which will properly proportion the reduction of water or air space $m \ n$ to the reduced focal length of the steam-jet at a reduced initial pressure.

Having described my invention, what I claim as new is—

1. A combining-cone the internal dimensions whereof are diameter of base and height each equal to four times diameter at apex, combined with a steam-cone the outer surface whereof is inclined to its axis at an angle of forty-five degrees, or thereabout, said steam-cone being arranged so that the apex of a cone formed by completing the sides of the steam-cone would extend within the base of said combining-cone one-fourth part the height of said combining-cone, and having a steam-jet opening equal to the section of said steam-cone when so completed, cut on the plane of the base of said combining-cone, or somewhere between that point and the conical apex, as set forth.

2. A combining-cone the internal dimensions whereof are diameter of larger base and height, each four times the diameter of its smaller base, combined with a steam-cone having its sides inclined to its axis at an angle of forty-five degrees, or thereabout, and arranged so that the apex of a cone formed by completing the sides of the steam-cone would extend within said combining-cone one-fourth the height of the same, and adjustable forward from that point, as and for the purpose described.

JOHN H. IRWIN.

Witnesses:
R. D. O. SMITH,
CHAS. F. R. HEUCKEROTH.